(12) United States Patent
Chen

(10) Patent No.: US 11,089,619 B2
(45) Date of Patent: Aug. 10, 2021

(54) DATA TRANSMISSION METHOD, DEVICE AND SYSTEM

(71) Applicant: China Academy of Telecommunications Technology, Beijing (CN)

(72) Inventor: Li Chen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/475,661

(22) PCT Filed: Feb. 5, 2018

(86) PCT No.: PCT/CN2018/075302
§ 371 (c)(1),
(2) Date: Jul. 2, 2019

(87) PCT Pub. No.: WO2018/127216
PCT Pub. Date: Jul. 12, 2018

(65) Prior Publication Data
US 2019/0349970 A1   Nov. 14, 2019

(30) Foreign Application Priority Data

Jan. 4, 2017  (CN) .......................... 201710005684.8

(51) Int. Cl.
*H04W 72/12* (2009.01)
*H04W 76/28* (2018.01)
(Continued)

(52) U.S. Cl.
CPC ... *H04W 72/1273* (2013.01); *H04W 52/0216* (2013.01); *H04W 52/0229* (2013.01);
(Continued)

(58) Field of Classification Search
CPC . H04W 72/1273; H04W 76/28; H04W 76/11; H04W 76/27; H04W 52/0216; H04W 52/0229
See application file for complete search history.

(56) References Cited

U.S. PATENT DOCUMENTS

2010/0284332 A1* 11/2010 Kim ...................... H04W 76/28
                                                              370/328
2011/0310804 A1* 12/2011 Beygzadeh ........... H04W 68/00
                                                              370/328
(Continued)

FOREIGN PATENT DOCUMENTS

CN        102264148 A       11/2011
CN        104221444 A       12/2014
(Continued)

*Primary Examiner* — Christine Ng
(74) *Attorney, Agent, or Firm* — Foley & Lardner LLP

(57) ABSTRACT

A data transmission method, device and system are provided. The method comprises: a UE in an RRC_INACTIVE state monitoring downlink data transmission within a determined time period after completing uplink data transmission; entering a DRX state after the determined time period has expired or downlink data has been completely received. The UE monitors the downlink data within the determined time period after completing the uplink data transmission, and enters the DRX state after the determined time period has expired or the downlink data has been completely received.

9 Claims, 2 Drawing Sheets

S101
A UE listens to downlink data transmission in a specific period of time after transmitting uplink data in an RRC_INACTIVE state S102
The UE enters a DRX state after the specific period of time expires, or the UE receives downlink data

(51) Int. Cl.
　　　*H04W 76/11*　　　(2018.01)
　　　*H04W 76/27*　　　(2018.01)
　　　*H04W 52/02*　　　(2009.01)

(52) U.S. Cl.
　　　CPC ........ *H04W 72/1289* (2013.01); *H04W 76/11* (2018.02); *H04W 76/27* (2018.02); *H04W 76/28* (2018.02)

(56) References Cited

U.S. PATENT DOCUMENTS

| | | | | |
|---|---|---|---|---|
| 2014/0112297 | A1* | 4/2014 | Lei | H04W 72/1284 |
| | | | | 370/329 |
| 2015/0304883 | A1* | 10/2015 | Tabet | H04W 72/1252 |
| | | | | 370/238 |
| 2016/0057805 | A1* | 2/2016 | Eriksson | H04B 17/391 |
| | | | | 370/280 |
| 2017/0188386 | A1* | 6/2017 | Hoglund | H04W 72/0453 |
| 2018/0049254 | A1* | 2/2018 | Xu | H04W 72/0406 |
| 2018/0343701 | A1* | 11/2018 | Ma | H04W 28/0268 |
| 2020/0092805 | A1* | 3/2020 | Zhang | H04W 76/28 |

FOREIGN PATENT DOCUMENTS

| | | | |
|---|---|---|---|
| CN | 105992266 | A | 10/2016 |
| CN | 106134260 | A | 11/2016 |
| CN | 106256145 | A | 12/2016 |
| WO | WO2016160292 | A1 | 10/2016 |
| WO | WO2016204164 | A1 | 12/2016 |

* cited by examiner

DATA TRANSMISSION METHOD, DEVICE AND SYSTEM

This application is a National Stage of International Application No. PCT/CN2018/075302, filed Feb. 5, 2018, which claims priority to Chinese Patent Application No. 201710005684.8, filed Jan. 4, 2017, both of which are hereby incorporated by reference in their entireties.

FIELD

The present application relates to the field of data transmission, and particularly to a data transmission method, device, and system.

BACKGROUND

At present, as wireless communication systems are advancing, there are coexisting demands for various types of User Equipments (UEs), and various types of services, saving power of the UEs, saving network resources, etc. In order to save power of a UE, and to transmit data rapidly, such an inactive UE state (RRC_INACTIVE) has been introduced that the UE in the RRC_INACTIVE state remains connected with a core network, but is not connected via any air interface, that is, the UE has no connection with a specific cell for transmitting data between them.

A next-generation wireless communication system (an NR system or a 5G system) supports three Radio Resource Control (RRC) states which are an idle state (RRC_IDLE), an inactive state (RRC_INACTIVE), and a connected state (RRC_CONNECTED) respectively, which are referred simply to as an idle state, an RRC_INACTIVE state, and a connected state respectively.

In the RRC_INACTIVE state, although a UE context is stored in a network-side gNB (Next Generation NodeB) and a UE, they are not connected via any air interface, and if the UE has data to be transmitted, then it will initiate a connection temporarily. In the related art, if the UE has a large amount of data to be transmitted, the UE will enter the connected state, and if the UE has a burst of small data to be transmitted, the UE will be activated each time. Uplink data can be transmitted by the UE in a random access or a contention mode. For downlink data, the gNB can only instruct the UE to receive the downlink data, and transmit the downlink data to the UE, when the UE receives a notification. In order to save power of the UE, the UE receives the notification in a Discontinuous Reception (DRX) mode, and the UE can only receive the notification after waking up at a specific instance of time in a DRX cycle, but the DRX cycle is typically long. Accordingly in this downlink data transmission scheme, the gNB may be discouraged from transmitting the downlink data to the UE in the RRC_INACTIVE state in a timely manner, and since transmission of the downlink data is delayed, subsequent data transmission may be further delayed.

SUMMARY

Embodiments of the disclosure provide a data transmitting method, device, and system so as to address the problem in the prior art that there is such a long DRX periodicity of the UE in the RRC_INACTIVE state that the gNB can not transmit downlink data to the UE in the RRC_INACTIVE state in a timely manner, thus further delaying subsequent data transmission.

An embodiment of the disclosure discloses a data transmitting method including: listening, by a UE, to downlink data transmission in a specific period of time after transmitting uplink data in an RRC_INACTIVE state; and entering a Discontinuous Reception (DRX) state after the specific period of time expires, or downlink data are received.

Furthermore the listening to downlink data transmission in the specific period of time includes: entering, by the UE, a consecutive reception state after transmitting the uplink data, until downlink data transmission are detected; or entering, by the UE, a consecutive reception state after transmitting the uplink data, starting a timer T1, and listening to downlink data transmission in a timing length of time of the timer T1; or starting, by the UE, a timer T2 after transmitting the uplink data, entering the DRX state in a timing length of time of the timer T2, starting a timer T3 after the timer T2 expires, entering a consecutive reception state, and listening to downlink data transmission in a timing length of time of the timer T3.

Furthermore the listening to downlink data transmission in the specific period of time further includes: receiving, by the UE, the downlink data including information of a network side to instruct the UE to further listen to downlink data transmission, and listening again to downlink data transmission in the specific period of time; or receiving, by the UE, the downlink data or a downlink scheduling command, starting a timer T4, listening to downlink data transmission in a timing length of time of the timer T4, and restarting the timer T4 upon reception of new downlink data or a new downlink scheduling command.

Furthermore the timing length of time of the timer T1, the timing length of time of the timer T2, the timing length of time of the timer T3, and the timing length of time of the timer T4 are determined as follows: they are configured by the network side for the UE via a broadcast message; or they are configured by the network side for the UE via dedicated signaling; or they are prescribed in a protocol.

Furthermore the uplink data transmission include: any one instance of uplink data transmission; or any one instance of uplink data transmission of a specific type of service; or transmission of a specific uplink data packet of a specific type of service; or uplink data transmission in a preset period of time.

Furthermore the specific type of service is configured by the network side for the UE via a broadcast message, or configured by the network side for the UE via dedicated signaling, where the UE is configured by the network side with the specific type of service via the broadcast message or the dedicated signaling carrying identifier information of the type of service, where the identifier information of the type of service includes an application layer identifier, a Radio Bearer Identifier (RB ID), a Logic Channel Identifier (LCID), or a Flow Identifier (ID).

Furthermore the specific uplink data packet is an uplink data packet requiring the network side to transmit corresponding downlink data transmission.

Furthermore the preset period of time is configured by the network side for the UE via a broadcast message; or the preset period of time is configured by the network side for the UE via dedicated signaling; or the preset period of time is a period of time in which transmission of the specific type of service is active, or the UE has data to be transmitted.

Furthermore when the UE transmits an uplink data packet in the RRC_INACTIVE state, before the UE listens to downlink data transmission in the specific period of time, the method further includes: transmitting indication information to the network side that the UE is going to listen to downlink data transmission.

Furthermore the receiving the downlink data includes: receiving a downlink notification transmitted by the network side to page the UE, and receiving downlink data transmitted together with the downlink notification; or receiving a downlink scheduling command transmitted by the network side, which carries an RNTI common to RRC_INACTIVE UEs, receiving downlink data transmission scheduled by the downlink scheduling command, determining whether UE ID information carried in the downlink data transmission is the same as its own UE ID information, and if so, then parsing the downlink data transmission for the downlink data; or receiving a downlink scheduling command transmitted by the network side, determining the C-RNTI of the UE carried in the downlink scheduling command is the same as its own C-RNTI, and if so, then receiving downlink data transmission scheduled by the downlink scheduling command.

An embodiment of the disclosure discloses a data transmitting method including: transmitting, by a network side, downlink data to a UE in a specific period of time after uplink data are transmitted by the network side with the UE in an RRC_INACTIVE state.

Furthermore the transmitting the downlink data to the UE in the specific period of time includes: transmitting, the downlink data to the UE at any instance of time after the uplink data are transmitted by the network side with the UE; or starting a timer T1 after the uplink data are transmitted by the network side with the UE, and transmitting the downlink data to the UE in a timing length of time of the timer T1; or starting a timer T2 after the uplink data are transmitted by the network side with the UE, starting a timer T3 after the timer T2 expires, and transmitting the downlink data to the UE in a timing length of time of the timer T3.

Furthermore the transmitting the downlink data to the UE in the specific period of time further includes: transmitting, by the network side, information to the UE to instruct the UE to further listen to downlink data transmission, and transmitting downlink data again to the UE in the specific period of time; or starting, by the network side, a timer T4 after transmitting the downlink data or a downlink scheduling command, and restarting the timer T4 after transmitting new downlink data or a new downlink scheduling command.

Furthermore the timing length of time of the timer T1, the timing length of time of the timer T2, the timing length of time of the timer T3, and the timing length of time of the timer T4 are preconfigured by the network side for the UE, or prescribed in a protocol.

Furthermore the uplink data include: any one set of uplink data; or any one set of uplink data of a specific type of service; or a specific uplink data packet of a specific type of service; or uplink data in a preset period of time.

Furthermore the specific type of service is preconfigured by the network side for the UE.

Furthermore the specific uplink data packet is an uplink data packet requiring the network side to transmit corresponding downlink data transmission.

Furthermore the transmitting, by the network side, the uplink data with the UE in the RRC_INACTIVE state includes: receiving indication information transmitted by the UE that the UE is going to listen to downlink data transmission.

Furthermore the transmitting the downlink data to the UE includes: transmitting a downlink notification to the UE to page the UE, and transmitting the downlink data together with the downlink notification; or transmitting a downlink scheduling command to the UE, where the downlink scheduling command carries an RNTI common to RRC_INACTIVE UEs, and scheduling downlink data transmission to the UE according to the downlink scheduling command, where the downlink data transmission carries UE ID information and the downlink data; or transmitting a downlink scheduling command to the UE, and scheduling downlink data transmission to the UE according to the downlink scheduling command, where the downlink scheduling command carries a C-RNTI of the UE.

An embodiment of the disclosure discloses a data transmitting device including: a listening module configured to listen to downlink data transmission in a specific period of time after a UE transmits uplink data in an RRC_INACTIVE state; and a receiving and sleeping module configured to enter a Discontinuous Reception (DRX) state after the specific period of time expires, or downlink data are received.

An embodiment of the disclosure discloses a data transmitting device including: a receiving module configured to transmit uplink data with a UE in an RRC_INACTIVE state; and a transmitting module configured to transmit downlink data to the UE in a specific period of time.

An embodiment of the disclosure discloses a data transmitting system including the data transmission device above applicable to a UE, and the data transmitting device above applicable to a network-side device.

An embodiment of the disclosure discloses a UE including: a transceiver configured to transmit and receive data under the control of a processor, and configured: to transmit uplink data and downlink data; and the processor configured to read and execute program in a memory: to listen to downlink data transmission in a specific period of time after the UE transmits uplink data in an RRC_INACTIVE state; and to enter a Discontinuous Reception (DRX) state after the specific period of time expires, or downlink data are received.

An embodiment of the disclosure discloses a gNB including: a processor configured to read and execute program in a memory: to determine whether uplink data are transmitted by the network side with a UE in an RRC_INACTIVE state; and a transceiver configured to transmit and receive data under the control of the processor, and configured: to transmit downlink data to the UE in a specific period of time after the uplink data are transmitted by the network side with the UE in an RRC_INACTIVE state.

An embodiment of the disclosure discloses a computer device including a memory, a processor, and computer program stored in the memory, and executable on the processor, where the processor executes the computer program to perform the data transmitting method at the UE side.

An embodiment of the disclosure discloses a computer device including a memory, a processor, and computer program stored in the memory, and executable on the processor, where the processor executes the computer program to perform the data transmitting method at the network side.

In the data transmitting method, device, and system according to the embodiments of the disclosure, the method includes: a UE listens to downlink data transmission in a specific period of time after transmitting uplink data in an RRC_INACTIVE state; and enters a DRX state after the specific period of time expires, or downlink data are received. Since the UE can listen to downlink data in the specific period of time after transmitting uplink data, and enter the DRX state after the specific period of time expires, or downlink data are received, the gNB can transmit the downlink data to the UE in the RRC_INACTIVE state in a timely manner to thereby avoid subsequent data transmission from being delayed.

BRIEF DESCRIPTION OF THE DRAWINGS

In order to make the technical solutions according to the embodiments of the disclosure or in the prior art more apparent, the drawings to which reference is to be made in the description of the embodiments or the prior art will be introduced below in brevity, and apparently the embodiments to be described below are only some embodiments of the disclosure. Those ordinarily skilled in the art can further derive the other drawings from these drawings without any inventive effort.

DETAILED DESCRIPTION OF THE EMBODIMENTS

In order to enable a gNB to transmit downlink data to a UE in an RRC_INACTIVE state in time, so as to avoid subsequent data transmission from being delayed, the embodiments of the disclosure provide a data transmission method, device, and system.

The technical solutions according to the embodiments of the disclosure will be described below clearly and fully with reference to the drawings in the embodiments of the disclosure. Apparently, the embodiments to be described are only a part but not all of the embodiments of the disclosure. Based upon the embodiments here of the disclosure, all the embodiments which can occur to those ordinarily skilled in the art without any inventive effort shall fall into the claimed scope of the disclosure.

Figure 1:
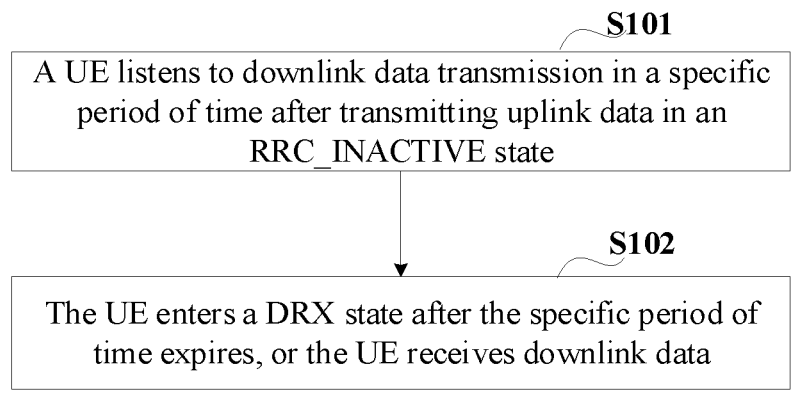
FIG. 1 is a schematic diagram of a data transmission process according to an embodiment of the disclosure.

FIG. 1 is a schematic diagram of a data transmission process according to an embodiment of the disclosure, where the process includes the following operations.

In an operation S101, a UE listens to downlink data transmission in a specific period of time after transmitting uplink data in an RRC_INACTIVE state.

In an operation S102, the UE enters a DRX state after the specific period of time expires, or the UE receives downlink data.

The data transmission method according to the embodiment of the disclosure is applicable to a UE. The UE transmits uplink data with a gNB, or receives downlink data transmitted by the gNB. The UE listens to downlink data transmission in a specific period of time after transmitting the uplink data in the RRC_INACTIVE state. The UE determines whether the specific period of time expires, and determines whether the downlink data are received, and if the UE determines that the specific period of time expires, or that the downlink data are received, the UE will enter the DRX state.

Since the UE listens to downlink data in the specific period of time after transmitting the uplink data, and enters the DRX state after the specific period of time expires, or the downlink data are received. The gNB transmits the downlink data to the UE in the RRC_INACTIVE state in a timely manner to thereby avoid subsequent data transmission from being delayed.

If the gNB determines that there are downlink data to be transmitted subsequently, after the downlink data are transmitted, the gNB will instruct the UE while transmitting the downlink data to further listen to downlink data transmission. Accordingly further to the embodiment above, if the UE receives downlink data, then before the UE enters the DRX state, the method will further include: when the downlink data received by the UE includes information transmitted by the gNB to instruct the UE to further listen to downlink data transmission, and the UE listens again to downlink data transmission in the specific period of time.

The UE receives downlink data transmitted by the gNB. If the downlink data includes information transmitted by the gNB to instruct the UE to further listen to downlink data transmission, the UE will listen again to downlink data transmission in the specific period of time. If the downlink data does not include any information of the gNB to instruct the UE to further listen to downlink data transmission, the UE will enter the DRX state after the specific period of time expires, or the downlink data are received.

In the embodiment above, the listening to downlink data transmission in the specific period of time includes: the UE enters a consecutive reception state after transmitting the uplink data, until the UE detects downlink data transmission; or the UE enters a consecutive reception state after transmitting the uplink data, starts a timer T1, and listens to downlink data transmission in a timing length of time of the timer T1; or the UE starts a timer T2 after transmitting the uplink data, and enters the DRX state in a timing length of time of the timer T2, and after the timer T2 expires, the UE starts a timer T3, enters a consecutive reception state, and listens to downlink data transmission in a timing length of time of the timer T3.

Particularly the UE enters the consecutive reception state after transmitting the uplink data, listens to downlink data transmission until the UE receives downlink data transmission, and enters the DRX state after receiving downlink data.

Alternatively the UE enters the consecutive reception state after transmitting the uplink data, starts a timer T1, listens to downlink data transmission, and enters the DRX state after the timer T1 expires, or the downlink data are received. The timing length of time of the timer T1 is configured by the gNB for each UE via a broadcast message, or is configured by the gNB for the UE via dedicated signaling, or is prescribed in a protocol.

Alternatively the UE starts a timer T2 after transmitting the uplink data, and enters the DRX state while the timer T2 is running, and after the timer T2 expires, the UE enters the consecutive reception state, and also starts a timer T3, listens to downlink data transmission in a timing length of time of the timer T3, and enters the DRX state after the timer T3 expires, or the downlink data are received.

The timing length of time of the timer T2 corresponds to a period of time after the uplink data are transmitted, until the gNB is ready for transmitting the downlink data. For a specific service, for example, in the case that downlink data transmission is defined as Transmission Control Protocol (TCP) ACKnowledgement (ACK) (TCP ACK) symbol feedback for uplink transmission data, the timing length of time of the timer T2 can be estimated.

Particularly the timing length of time of the timer T2 is configured by the gNB for each UE via a broadcast message, or is prescribed in a protocol, or is configured by the gNB for the UE via dedicated signaling. The timing length of time of the timer T3 is configured by the gNB for each UE via a broadcast message, or is prescribed in a protocol, or is configured by the gNB for the UE via dedicated signaling.

Here the timing length of time of the timer T1, the timing length of time of the timer T2, the timing length of time of the timer T3, and a timing length of time of a timer T4 may or may not be determined in the same way. For example, the timing length of time of the timer T2 is specified in a protocol, and the timing length of time of the timer T3 is configured by the gNB for the UE via dedicated signaling.

The listening to downlink data transmission in the specific period of time further includes: the UE receives downlink data including information of the network side to instruct the UE to further listen to downlink data transmission, and listens again to downlink data transmission in the specific period of time; or the UE receives downlink data or a downlink scheduling command, starts a timer T4, listens to downlink data transmission in the timing length of time of the timer T4, and restarts the timer T4 upon reception of new downlink data or a new downlink scheduling command.

If the UE is not configured by the network side with the timer T4 for listening to downlink data transmission, the UE will receive downlink data including information of the network side to instruct the UE to further listen to downlink data transmission, and listen again to downlink data transmission in the specific period of time.

Particularly the UE may enter the consecutive reception state upon reception of downlink data including information to instruct the UE to further listen to downlink data transmission, further listen to downlink data transmission until downlink data transmission is received, and information to instruct the UE to further listen to downlink data transmission is not received, and enter the DRX state.

Alternatively the UE enters the consecutive reception state after transmitting the uplink data, starts the timer T1, listens to downlink data transmission in the timing length of time of the timer T1, restarts the timer T1 when downlink data received in the timing length of time of the timer T1 includes information of the gNB to instruct the UE to further listen to downlink data transmission, and listens again to downlink data transmission in the timing length of time of the timer T1. The UE enters the DRX state after the timing length of time of the restarted timer T1 expires, or the downlink data are received.

Alternatively the UE starts the timer T2 after transmitting the uplink data, enters the DRX state in the timing length of time of the timer T2, starts the timer T3 after the timing length of time of the timer T2 expires, enters the consecutive reception state, and listens to downlink data transmission in the timing length of time of the timer T3. When downlink data received in the timing length of time of the timer T3 includes information of the gNB to instruct the UE to further listen to downlink data transmission, the UE restarts the timer T3, and listens again to downlink data transmission in the timing length of time of the timer T3. The UE enters the DRX state after the timing length of time of the restarted timer T3 expires, or the downlink data are received.

If the UE is configured by the network side with the timer T4 for listening to downlink data transmission, then the UE will receive downlink data or a downlink scheduling command, start the timer T4, listen to downlink data transmission in the timing length of time of the timer T4, and restart the timer T4 upon reception of new downlink data or a downlink scheduling command.

Particularly in respective embodiments in which the corresponding UE listens to downlink data transmission in the specific period of time, if the corresponding UE enters the consecutive reception state after transmitting the uplink data, the UE will listen to downlink data transmission, start the timer T4 upon reception of downlink data transmission or a downlink scheduling command, restart the timer T4 upon reception of new downlink data transmission or a new downlink scheduling command, and enter the DRX state after the timer T4 expires.

If the corresponding UE enters the consecutive reception state after transmitting the uplink data, and starts the timer T1, then the UE will listen to downlink data transmission is detected, start the timer T4 upon reception of downlink data transmission or a downlink scheduling command, restart the timer T4 upon reception of new downlink data transmission or a new downlink scheduling command, and enter the DRX state after the timer T4 expires, where the timing length of time of the timer T4 may or may not be the same as the timing length of time of the timer T1.

If the corresponding UE starts the timer T2 after transmitting the uplink data, then the UE will enter the DRX state while the timer T2 is running, enter the consecutive reception state and also start the timer T3 after the timer T2 expires, listen to downlink data transmission while the timer T3 is running, start the timer T4 upon reception of downlink data transmission or a downlink scheduling command, restart the timer T4 upon reception of new downlink data transmission or a new downlink scheduling command, and enter the DRX state after the timer T4 expires, where the timing length of time of the timer T4 may or may not be the same as the timing length of time of the timer T3.

In the embodiments above, the uplink data transmission can be any one instance of uplink data transmission, or can be any one instance of uplink data transmission of a specific type of service, or can be transmission of a specific uplink data packet of a specific type of service, or can be uplink data transmission in a preset period of time.

Particularly the UE starts a downlink data transmission listening procedure upon completion of the any one instance of uplink data transmission in the RRC_INACTIVE state.

Alternatively the UE starts a downlink data transmission listening procedure upon completion of the any one instance of uplink data transmission of the specific service in the RRC_INACTIVE state.

Alternatively the UE starts a downlink data transmission listening procedure after transmitting the specific uplink data packet of the specific service in the RRC_INACTIVE state.

The specific type of service is configured by the gNB for each UE via a broadcast message, where there is the same specific type of service for each UE, or the specific type of service may be configured by the gNB for the UE via dedicated signaling, where the specific type of service for each UE may or may not be the same.

When the UE is configured by the gNB with the specific type of service, identifier information of the type of service is carried in the broadcast message or the dedicated signaling, and the identifier information of the type of service includes an application layer identifier, a Radio Bearer Identifier (RB ID), a Logical Channel Identifier (LC ID), a Flow Identifier (ID), etc.

The network side can configure the UE with the specific type of service, but also can configure the specific uplink data packet for the specific type of service, where the specific uplink data packet is an uplink data packet requiring the network side to transmit corresponding downlink data transmission. That is, the uplink data packet refers to a subsequent data packet, determined by the UE, corresponding to downlink data transmission. For example, in a TCP service, the UE receives downlink TCP ACK information after transmitting several instances of TCP uplink data transmission. An uplink data packet before the TCP ACK information is the specific uplink data packet.

When the UE transmits a specific uplink data packet of a specific type of service in the RRC_INACTIVE state, before the UE listens to downlink data transmission in the specific period of time, the method further includes: transmitting indication information to the network side that the UE is going to listen to downlink data transmission.

As can be apparent from the description above, the UE receives downlink TCP ACK information after transmitting several instances of TCP uplink data transmission, so when the UE transmits the specific uplink data packet of the specific type of service in the RRC_INACTIVE state, the UE can transmit indication information to the network side gNB that the UE is going to listen to downlink data transmission so that the UE receives downlink data transmission of the gNB.

Alternatively the UE starts a downlink data transmission listening procedure after transmitting the uplink data in a preset period of time.

The preset period of time is configured by the network side for each UE via a broadcast message, or is configured by the network side for the UE via dedicated signaling, or the UE keeps on starting a downlink data transmission listening procedure while transmission of a specific service is being active, or data are being transmitted. When the preset period of time is configured by the network side for each UE via a broadcast message, there is the same preset period of time for each UE. When the preset period of time is configured by the network side for the UE via dedicated signaling, the preset period of time for each UE may or may not be the same.

In the embodiments of the disclosure, the receiving the downlink data includes: receiving a downlink notification transmitted by the network side to page the UE, and receiving downlink data transmitted together with the downlink notification; or receiving a downlink scheduling command transmitted by the network side, where the downlink scheduling command carries a Radio Network Temporary Identifier (RNTI) common to RRC_INACTIVE UEs, receiving downlink data transmission scheduled by the downlink scheduling command, determining whether UE ID information carried in the downlink data transmission is the same as its own UE ID information, and if so, parsing the downlink data transmission for downlink data; or receiving a downlink scheduling command transmitted by the network side, determining whether a C-RNTI of the UE carried in the downlink scheduling signaling is the same as its own Cell-Radio Network Temporary Identifier (C-RNTI), and if so, receiving downlink data transmission scheduled by the downlink scheduling command.

Particularly the network side, and particularly the gNB, instructs the UE via a Radio Access Network (RAN) side notification to receive downlink data transmission, and transmits downlink data to the UE. The RAN side notification can be transmitted in an RAN based notification area (RNA) including one or more cells, or can be only transmitted in a cell, determined by the gNB, where the UE is located.

Alternatively the network side, and particularly the gNB, schedules downlink data transmission for the UE via a scheduling command NR-PDCCH scrambled using a special RRC_INACTIVE-RNTI in a cell where the UE is located, where a Media Access Control (MAC) Protocol Data Unit (PDU) of the downlink data transmission includes MAC layer Control Element (CE) carrying an RRC_INACTIVE UE ID, and a downlink data packet to be transmitted to the UE. The UE transmits Automatic Repeat Request (ARQ) feedback at a feedback position corresponding to the downlink data transmission; and if the gNB does not receive any ACK feedback, the gNB will transmit downlink data in the same way while the UE is listening to downlink data transmission, until ACK feedback of the UE is received, or a timer expires. If the gNB has not transmitted any downlink data successfully after the timer expires, the gNB will instruct the UE via a notification to receive downlink data transmission, and transmit downlink data to the UE while the UE is listening to the next downlink data transmission, that is, the gNB will fall back to instruct the message via an RAN based notification to receive downlink data transmission, and to transmit downlink data to the UE.

Alternatively the network side, and particularly the gNB, schedules downlink data transmission for the UE via a scheduling command NR-PDCCH scrambled using a C-RNTI in a cell where the UE is located. The C-RNTI is allocated by the gNB for the UE in the connected state before it enters the RRC_INACTIVE state, and stored in a UE context of the UE in the RRC_INACTIVE state. The UE transmits ARQ feedback at a feedback position corresponding to the downlink data transmission. If the gNB has not received any ACK feedback, the gNB will transmit downlink data in the same way while the UE is listening to downlink data transmission, until ACK feedback of the UE is received, or a timer expires. If the gNB has not transmitted any downlink data successfully after the timer expires, the gNB will instruct the UE via a notification to receive downlink data transmission, and transmit downlink data to the UE while the UE is listening to the next downlink data transmission. That is, the gNB will fall back to instruct the message via an RAN based notification to receive downlink data transmission, and to transmit downlink data to the UE. In this way, the gNB shall maintain the C-RNTI of the UE in the connected state, in the RNA area, for the UE in the RRC_INACTIVE state, and the C-RNTI shall be unique in the cells of the RNA.

Figure 2:
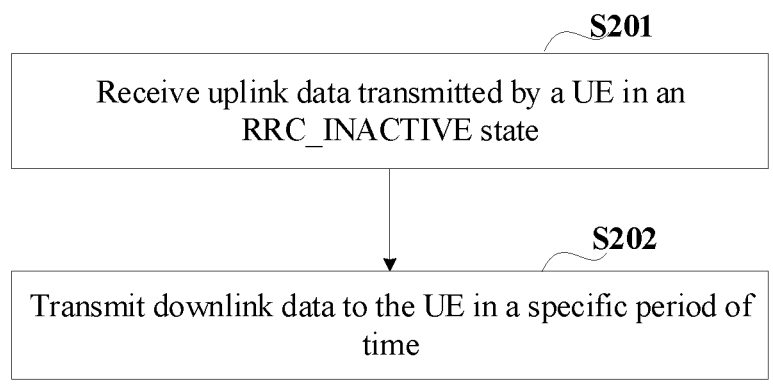
FIG. 2 is a schematic diagram of a data transmission process according to an embodiment of the disclosure.

FIG. 2 is a schematic diagram of a data transmitting process according to an embodiment of the disclosure, where the process applicable to the network side includes the following operations.

An operation S201 is to receive uplink data transmitted by a UE in an RRC_INACTIVE state.

An operation S202 is to transmit downlink data to the UE in a specific period of time.

Since the gNB can transmit the downlink data to the UE in the specific period of time, it can transmit the downlink data to the UE in the RRC_INACTIVE state in time to thereby avoid subsequent data transmission from being delayed.

The transmitting the downlink data to the UE in the specific period of time includes: the network side transmits the downlink data to the UE at any instance of time after receiving the uplink data with the UE; or the network side starts a timer T1 after receiving the uplink data with the UE, and transmits the downlink data to the UE in a timing length of time of the timer T1; or the network side starts a timer T2 after receiving the uplink data with the UE, starts a timer T3 after the timer T2 expires, and transmits the downlink data to the UE in a timing length of time of the timer T3.

The transmitting the downlink data to the UE in the specific period of time further includes: the network side transmits information to the UE to instruct the UE to further listen to downlink data transmission, and if the network side has new information to instruct the UE to further listen to downlink data transmission, the network side will transmit downlink data to the UE in the specific period of time; or the network side starts a timer T4 after transmitting downlink data or a downlink scheduling command, and restarts the timer T4 after transmitting new downlink data or a new downlink scheduling command.

Here the timing length of time of the timer T1, the timing length of time of the timer T2, the timing length of time of the timer T3, and a timing length of time of a timer T4 may or may not be determined in the same way. For example, the timing length of time of the timer T2 is specified in a protocol, and the timing length of time of the timer T3 is configured by the gNB for the UE via dedicated signaling.

The uplink data include any one set of uplink data; or any one set of uplink data of a specific type of service; or a specific uplink data packet of a specific type of service; or uplink data in a preset period of time.

The type of service is preconfigured by the network side for the UE.

The specific uplink data packet is an uplink data packet requiring the network side to transmit corresponding downlink data transmission.

When the network side receives the uplink data with the UE, the method further includes: the network side receives indication information transmitted by the UE that the UE is going to listen to downlink data transmission.

The transmitting the downlink data to the UE includes: transmitting a downlink notification to the UE to page the UE, and transmitting the downlink data together with the notification; or transmitting a downlink scheduling command to the UE, where the downlink scheduling command carries an RNTI common to RRC_INACTIVE UEs, and scheduling downlink data transmission to the UE according to the downlink scheduling command, where the downlink data transmission carries UE ID information and the downlink data; or transmitting a downlink scheduling command to the UE, and scheduling downlink data transmission to the UE according to the downlink scheduling command, where the downlink scheduling command carries a C-RNTI of the UE.

The data transmitting processes according to the embodiments of the disclosure will be described respectively below in the following respective embodiments of the respective scenarios above.

Each timer above is running in the timing length of time of the timer.

Firstly respective embodiments of the disclosure will be described in which the UE starts listening to downlink data transmission upon completion of any one instance of uplink data transmission in the RRC_INACTIVE state.

First Embodiment

The UE enters the consecutive reception state upon completion of any one instance of uplink data transmission in the RRC_INACTIVE state, listens to downlink data transmission until downlink data transmission is received, and enters the DRX state after receiving downlink data.

In the embodiment of the disclosure, the UE starts a downlink data transmission listening procedure under a condition that the UE starts a downlink data transmission listening procedure upon completion of any one instance of uplink data transmission in the RRC_INACTIVE state.

A period of time for listening to downlink data is determined in such a way that the UE enters the consecutive reception state upon completion of uplink data transmission in the RRC_INACTIVE state, listens to downlink data transmission until downlink data transmission is detected, and enters the DRX state after receiving downlink data.

In the embodiment of the disclosure, operations performed by the UE at the UE side include the following operations.

The first operation is to enter the consecutive reception state upon completion of any one instance of uplink data transmission in the RRC_INACTIVE state.

The second operation is to listen to downlink data transmission, and if downlink data transmission is detected, to proceed to the third operation; and if no downlink data transmission is detected, to further listen to downlink data transmission.

The third operation includes the following branches in parallel: in a branch 1, if the UE is not configured by the gNB with the timer T4 for further listening to downlink data transmission, the UE will receive instruction information transmitted by the gNB to further listen to downlink data transmission, further listen to downlink data transmission, and enter the DRX state after receiving downlink data; or in a branch 2, if the UE is configured by the gNB with the timer T4 for further listening to downlink data transmission, the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires; or in a branch 3, if the UE is not configured by the gNB with the timer T4 for further listening to downlink data transmission, and the gNB does not instruct the UE in downlink data transmission to further listen to downlink data transmission, the UE will enter the DRX state directly after receiving downlink data.

In the embodiment of the disclosure, operations performed by the gNB include the following operations.

The first operation is to determine that the UE enters the consecutive reception state, after receiving uplink data transmission of the UE.

The second operation is to transmit downlink data to the UE at any instance of time, when there are the downlink data to be transmitted to the UE.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, the gNB may transmit instruction information to the UE in downlink data transmission to further listen to downlink data transmission, determine that the UE remains in the consecutive reception state, and further transmit downlink data to the UE; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, after the timer T4 expires, and will not transmit any downlink data to the UE while the UE remains in the DRX state, where in this branch, the gNB can transmit downlink data to the UE while the timer T4 is running, determine that the timer T4 of the UE is restarted, when downlink data or a downlink scheduling command are or is transmitted each time, and determine that the UE enters the DRX state, after the timer T4 expires, and will not transmit any downlink data to the UE while the UE remains in the DRX state; or in a branch 3, if the UE is not configured by the gNB with the timer T4 for further listening to downlink data transmission, and the gNB does not instruct the UE in downlink data transmission to further listen to downlink data transmission, the gNB will determine that the UE enters the DRX state after receiving downlink data transmission, and will not transmit any downlink data to the UE while the UE remains in the DRX state.

Second Embodiment

The UE enters the consecutive reception state upon completion of any one instance of uplink data transmission in the RRC_INACTIVE state, starts the timer T1, listens to downlink data transmission in the timing length of time of the timer T1, and enters the DRX state after the timer T1 expires, or downlink data are received.

In the embodiment of the disclosure, a period of time for the UE to listen to downlink data is determined in such a way that the UE enters the consecutive reception state upon completion of uplink data transmission, stars the timer T1, listens to downlink data transmission, and enters the DRX state after the timer T1 expires, or downlink data are received. The timing length of time of the timer T1 can be configured by the gNB for each UE via a broadcast message, or can be configured by the gNB for the UE via dedicated signaling, or can be specified in a protocol.

The UE starts a downlink data transmission listening procedure under the condition that the UE starts a downlink data transmission listening procedure after transmitting any one instance of uplink data transmission in the RRC_INACTIVE state.

In the embodiment of the disclosure, operations performed by the UE at the UE side include the following operations.

The first operation is to start the timer T1 upon completion of any one instance of uplink data transmission in the RRC_INACTIVE state.

The second operation is to enter the consecutive reception state and to listen to downlink data transmission while the timer T1 is running, and if no downlink data transmission is received, and the timer T1 expires, to enter the DRX state; or if downlink data transmission is received, to proceed to the third operation.

The third operation includes the following branches in parallel: in a branch 1, if the UE is not configured by the gNB with the timer T4 for further listening to downlink data transmission, then the UE will receive instruction information transmitted by the gNB to further listen to downlink data transmission, restart the timer T1, further listen to downlink data transmission, restart the timer T1 upon reception of new instruction information to further listen to downlink data transmission each time, listen to downlink data transmission while the timer T1 is running, and enter the DRX state after the timer T1 expires, or downlink data are received; or in a branch 2, if the UE is configured by the gNB with the timer T4 for further listening to downlink data transmission, then the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires, where in the branch 2, the timer T4 may be the same as the timer T1, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the UE will enter the DRX state directly after receiving downlink data.

In the embodiment of the disclosure, operations performed at the gNB include the following operations.

The first operation is to determine that the UE enters the consecutive reception state, and to start the timer T1, after receiving uplink data transmitted by the UE.

The second operation is to transmit downlink data to the UE at any instance of time, when there are the downlink data to be transmitted to the UE, while the timer T1 is running, and to proceed to the third operation after transmitting the downlink data.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, then the gNB may transmit instruction information to the UE in downlink data transmission to further listen to downlink data transmission, restart the timer T1 after transmitting the instruction information to further listen to downlink data transmission each time, determine that the UE is listening to downlink data transmission, and transmit downlink data to the UE, while the timer T1 is running, and determine that the UE enters the DRX state, after the timer T1 expires, and will not transmit any downlink data to the UE while the UE remains in the DRX state; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, after the timer T4 expires, and will not transmit any downlink data to the UE while the UE remains in the DRX state, where in the branch above, the timer T4 may be the same as the timer T1, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, the gNB will determine that the UE enters the DRX state after receiving downlink data, and will not transmit any downlink data to the UE while the UE remains in the DRX state.

Third Embodiment

The UE starts the timer T2 upon completion of any one instance of uplink data transmission in the RRC_INACTIVE state, enters the DRX state in the timing length of time of the timer T2, enters the consecutive reception state after the timer T2 expires, listens to downlink data transmission in the timing length of time of the timer T3, and enters the DRX state after the timer T3 expires, or downlink data are received.

In the embodiment of the disclosure, a period of time for the UE to listen to downlink data is determined in such a way that the UE starts the timer T2 upon completion of uplink data transmission, enters the DRX state while the timer T2 is running, enters the consecutive reception state and starts the timer T3 after the timer T2 expires, listens to downlink data transmission while the timer T3 is running, and enters the DRX state after the timer T3 expires, or downlink data are received. The timing length of time of the timer T2, and the timing length of time of the timer T3 can be configured by the gNB for each UE via a broadcast message, or can be configured by the gNB for the UE via dedicated signaling, or can be prescribed in a protocol. The timing length of time of the timer T2, and the timing length of time of the timer T3 may or may not be determined in the same way.

The UE starts a downlink data transmission listening procedure under the condition that the UE starts a downlink data transmission listening procedure after transmitting any one instance of uplink data transmission in the RRC_INACTIVE state.

In the embodiment of the disclosure, operations performed by the UE at the UE side include the following operations.

The first operation is to start the timer T2 upon completion of any one instance of uplink data transmission in the RRC_INACTIVE state, and not to listen to any downlink data transmission while the timer T2 is running.

The second operation is to start the timer T3 upon detecting that the timer T2 expires, and to enter the consecutive reception state and to listen to downlink data transmission while the timer T3 is running; and if no downlink data transmission is received, and the timer T3 expires, to enter the DRX state, or if downlink data transmission is received, to proceed to the third operation.

The third operation includes the following branches in parallel: in a branch 1, if the UE is not configured by the gNB with the timer T4 for further listening to downlink data transmission, the UE will receive instruction information transmitted by the gNB to further listen to downlink data transmission, restart the timer T3, further listen to downlink data transmission, restart the timer T3 upon reception of new instruction information to further listen to downlink data transmission each time, listen to downlink data transmission while the timer T3 is running, and enter the DRX state after the timer T3 expires, or downlink data are received; or in a branch 2, if the UE is configured by the gNB with the timer T4 for further listening to downlink data transmission, the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires, where in the branch 2, the timer T4 may be the same as the timer T3, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, the UE will enter the DRX state directly after receiving downlink data.

In the embodiment of the disclosure, operations performed at the gNB include the following operations.

The first operation is to prepare for transmitting downlink data to the UE, and to start the timer T2, after receiving uplink data transmitted by the UE.

The second operation is to start the timer T3 upon detecting that the timer T2 expires, to transmit downlink data to the UE when there are the downlink data to be transmitted to the UE, while the timer T3 is running, and to proceed to the third operation, or to determine that the UE enters the DRX state, after the timer T3 expires.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, then the gNB may transmit instruction information to the UE in downlink data transmission to further listen to downlink data transmission, restart the timer T3 after transmitting the instruction information to further listen to downlink data transmission each time, determine that the UE is listening to downlink data transmission, and transmit downlink data to the UE, while the timer T1 is running, and determine that the UE enters the DRX state, after the timer T1 expires, and will not transmit any downlink data to the UE while the UE remains in the DRX state; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, after the timer T4 expires, and will not transmit any downlink data to the UE while the UE remains in the DRX state, where in the branch above, the timer T4 may be the same as the timer T3, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the gNB will determine that the UE enters the DRX state after receiving downlink data, and will not transmit any downlink data to the UE while the UE remains in the DRX state.

Secondly respective embodiments of the disclosure will be described in which the UE starts listening to downlink data transmission upon completion of any one instance of uplink data transmission of a specific type of service in the RRC_INACTIVE state.

Fourth Embodiment

The UE enters the consecutive reception state upon completion of any one instance of uplink data transmission of a specific type of service in the RRC_INACTIVE state, listens to downlink data transmission until downlink data transmission is received, and enters the DRX state after receiving downlink data.

In the embodiment of the disclosure, a period of time for the UE to listen to downlink data is determined in such a way that the UE enters the consecutive reception state upon completion of uplink data transmission, listens to downlink data transmission until downlink data transmission is received, and enters the DRX state after receiving downlink data.

The UE starts a downlink data transmission listening procedure under the condition that the UE starts listening to downlink data transmission upon completion of any one instance of uplink data transmission of the specific type of service.

The specific type of service can be configured by the gNB for each UE via a broadcast message, or can be configured by the gNB for the UE via dedicated signaling. The UE is configured by the gNB with the specific type of service via the broadcast message or the dedicated signaling carrying identifier information of the type of service, and the identifier information of the type of service includes an application layer identifier, or an RB ID, or an LCID, or a flow ID.

In the embodiment of the disclosure, operations performed by the UE at the UE side include the following operations.

The first operation is to enter the consecutive reception state upon completion of any one instance of uplink data transmission of the specific type of service in the RRC_INACTIVE state, to listen to downlink data transmission, and to proceed to the second operation; or if the type of service of uplink data transmitted by the UE in the RRC_INACTIVE state does not allow the UE to listen to downlink data transmission, to enter the DRX state directly without proceeding to the second operation after transmitting the uplink data.

The second operation is to receive downlink data transmission, and to proceed to the third operation; or otherwise, to further listen to downlink data transmission.

The third operation includes the following branches in parallel: in a branch 1, if the UE is not configured by the gNB with the timer T4 for further listening to downlink data transmission, then the UE will receive instruction information transmitted by the gNB to further listen to downlink data transmission, further listen to downlink data transmission, and enter the DRX state after receiving downlink data; or in a branch 2, if the UE is configured by the gNB with the timer T4 for further listening to downlink data transmission, then the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires; or in a branch 3, if the UE is not configured by the gNB with the timer T4 for further listening to downlink data transmission, and the gNB does not instruct the UE in downlink data transmission to further listen to downlink data transmission, then the UE will enter the DRX state directly after receiving downlink data.

In the embodiment of the disclosure, operations performed at the gNB include the following operations.

The first operation is to determine whether a service including uplink data transmitted by the UE is of the specific type of service allowing the UE to listen to downlink data transmission, after receiving the uplink data, and if so, to determine that the UE enters the consecutive reception state, and to proceed to the second operation; otherwise, to determine that the UE enters the DRX state, without proceeding to the second operation.

The second operation is to transmit downlink data to the UE at any instance of time, when there are the downlink data to be transmitted to the UE.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, then the gNB may transmit instruction information to the UE in downlink data transmission to further listen to downlink data transmission, determine that the UE remains in the consecutive reception state, and subsequently transmit downlink data to the UE; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, after the timer T4 expires, and will not transmit any downlink data to the UE while the UE remains in the DRX state, where in this branch, the gNB can transmit downlink data to the UE while the timer T4 is running, determine that the timer T4 of the UE is restarted, when downlink data or a downlink scheduling command are or is transmitted each time, and determine that the UE enters the DRX state, after the timer T4 expires, and will not transmit any downlink data to the UE while the UE remains in the DRX state; or in a branch 3, if the UE is not configured by the gNB with the timer T4 for further listening to downlink data transmission, and the gNB does not instruct the UE in downlink data transmission to further listen to downlink data transmission, then the gNB will determine that the UE enters the DRX state after receiving downlink data, and will not transmit any downlink data to the UE while the UE remains in the DRX state.

Fifth Embodiment

The UE enters the consecutive reception state upon completion of any one instance of uplink data transmission of a specific type of service in the RRC_INACTIVE state, starts the timer T1, listens to downlink data transmission in the timing length of time of the timer T1, and enters the DRX state after the timer T1 expires, or downlink data are received.

In the embodiment of the disclosure, a period of time for the UE to listen to downlink data is determined in such a way that the UE enters the consecutive reception state upon completion of uplink data transmission, stars the timer T1, listens to downlink data transmission, and enters the DRX state after the timer T1 expires, or downlink data are received. The timing length of time of the timer T1 can be configured by the gNB for each UE via a broadcast message, or can be configured by the gNB for the UE via dedicated signaling, or can be specified in a protocol.

The UE starts a downlink data transmission listening procedure under the condition that the UE starts listening to downlink data transmission after transmitting any one instance of uplink data transmission of the specific type of service in the RRC_INACTIVE state.

The specific type of service can be configured by the gNB for each UE via a broadcast message, or can be configured by the gNB for the UE via dedicated signaling. The UE is configured by the gNB with the specific type of service via the broadcast message or the dedicated signaling carrying identifier information of the type of service, and the identifier information of the type of service includes an application layer identifier, or an RB ID, or an LCID, or a flow ID.

In the embodiment of the disclosure, operations performed by the UE at the UE side include the following operations.

The first operation is to start the timer T1 and to proceed to the second operation upon completion of any one instance of uplink data transmission of the specific type of service in the RRC_INACTIVE state; or if the type of service of uplink data transmitted by the UE in the RRC_INACTIVE state does not allow the UE to listen to downlink data transmission, to enter the DRX state directly without proceeding to the second operation after transmitting the uplink data.

The second operation is to enter the consecutive reception state and to listen to downlink data transmission while the timer T1 is running, and if no downlink data transmission is received, and the timer T1 expires, to enter the DRX state; or if downlink data transmission is received, to proceed to the third operation.

The third operation includes the following branches in parallel: in a branch 1, if the UE is not configured by the gNB with the timer T4 for further listening to downlink data transmission, then the UE will receive instruction information transmitted by the gNB to further listen to downlink data transmission, restart the timer T1, further listen to downlink data transmission, restart the timer T1 upon reception of new instruction information to further listen to downlink data transmission each time, listen to downlink data transmission while the timer T1 is running, and enter the DRX state after the timer T1 expires, or downlink data are received; or in a branch 2, if the UE is configured by the gNB with the timer T4 for further listening to downlink data transmission, then the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires, where in the branch 2, the timer T4 may be the same as the timer T1, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the UE will enter the DRX state directly after receiving downlink data.

In the embodiment of the disclosure, operations performed at the gNB include the following operations.

The first operation is to determine whether a service including uplink data transmitted by the UE is of the specific type of service allowing the UE to listen to downlink data transmission, after receiving the uplink data, and if so, to start the timer T1, to determine that the UE enters the consecutive reception state, and to proceed to the second operation; otherwise, to determine that the UE enters the DRX state, without proceeding to the second operation.

The second operation is to transmit downlink data to the UE when there are the downlink data to be transmitted to the UE, while the timer T1 is running, and to proceed to the third operation after transmitting the downlink data, or to determine that the UE enters the DRX state, after the timer T1 expires.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, then the gNB may transmit instruction information to the UE in downlink data transmission to further listen to downlink data transmission, restart the timer T1 after transmitting the instruction information to further listen to downlink data transmission each time, determine that the UE is listening to downlink data transmission, and transmit downlink data to the UE, while the timer T1 is running, and determine that the UE enters the DRX state, and will not transmit any downlink data to the UE, after the timer T1 expires; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, and will not transmit any downlink data to the UE, after the timer T1 expires, where in the branch 2, the timer T4 may be the same as the timer T1, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the gNB will determine that the UE enters the DRX state after receiving downlink data, and will not transmit any downlink data to the UE while the UE remains in the DRX state.

Sixth Embodiment

The UE starts the timer T2 upon completion of any one instance of uplink data transmission of a specific type of service in the RRC_INACTIVE state, enters the DRX state in the timing length of time of the timer T2, enters the consecutive reception state after the timer T2 expires, listens to downlink data transmission in the timing length of time of the timer T3, and enters the DRX state after the timer T3 expires, or downlink data are received.

In the embodiment of the disclosure, a period of time for the UE to listen to downlink data is determined in such a way that the UE starts the timer T2 upon completion of uplink data transmission, enters the DRX state while the timer T2 is running, enters the consecutive reception state and starts the timer T3 after the timer T2 expires, listens to downlink data transmission while the timer T3 is running, and enters the DRX state after the timer T3 expires, or downlink data are received, where the timing length of time of the timer T2, the timing length of time of the timer T3, and the timing length of time of the timer T4 can be configured by the gNB for each UE via a broadcast message, or can be configured by the gNB for the UE via dedicated signaling, or can be prescribed in a protocol, where the timing length of time of the timer T2, and the timing length of time of the timer T3 may or may not be determined in the same way.

The UE starts a downlink data transmission listening procedure under the condition that the UE starts listening to downlink data transmission after transmitting any one instance of uplink data transmission of the specific type of service in the RRC_INACTIVE state.

The specific type of service can be configured by the gNB for each UE via a broadcast message, or can be configured by the gNB for the UE via dedicated signaling. The UE is configured by the gNB with the specific type of service via the broadcast message or the dedicated signaling carrying identifier information of the type of service, and the identifier information of the type of service includes an application layer identifier, or an RB ID, or an LCID, or a flow ID.

In the embodiment of the disclosure, operations performed by the UE at the UE side include the following operations.

The first operation is to start the timer T2 upon completion of any one instance of uplink data transmission of the specific type of service in the RRC_INACTIVE state, and to proceed to the second operation without listening to downlink data transmission while the timer T2 is running; or if the type of service of uplink data transmitted by the UE in the RRC_INACTIVE state does not allow the UE to listen to downlink data transmission, to enter the DRX state directly without proceeding to the second operation after transmitting the uplink data.

The second operation is to start the timer T3 upon detecting that the timer T2 expires, and to enter the consecutive reception state and to listen to downlink data transmission while the timer T3 is running; and if no downlink data transmission is received, and the timer T3 expires, to enter the DRX state, or if downlink data transmission is received, to proceed to the third operation.

The third operation includes the following branches in parallel: in a branch 1, if the UE is not configured by the gNB with the timer T4 for further listening to downlink data transmission, then the UE will receive instruction information transmitted by the gNB to further listen to downlink data transmission, restart the timer T3, further listen to downlink data transmission, restart the timer T3 upon reception of new instruction information to further listen to downlink data transmission each time, listen to downlink data transmission while the timer T3 is running, and enter the DRX state after the timer T3 expires, or downlink data are received; or in a branch 2, if the UE is configured by the gNB with the timer T4 for further listening to downlink data transmission, then the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires, where in the branch 2, the timer T4 may be the same as the timer T3, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, the UE will enter the DRX state directly after receiving downlink data.

In the embodiment of the disclosure, operations performed at the gNB include the following operations.

The first operation is to determine whether a service including uplink data transmitted by the UE is of the specific type of service allowing the UE to listen to downlink data transmission, after receiving the uplink data, and if so, to prepare for transmitting downlink data to the UE, and to start the timer T2.

The second operation is to start the timer T3 upon detecting that the timer T2 expires, to transmit downlink data to the UE when there are the downlink data to be transmitted to the UE, while the timer T3 is running, and to proceed to the third operation upon completion transmission of the downlink data, or to determine that the UE enters the DRX state, after the timer T3 expires.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, then the gNB may transmit instruction information to the UE in downlink data transmission to further listen to downlink data transmission, restart the timer T3 after transmitting the instruction information to further listen to downlink data transmission each time, determine that the UE is listening to downlink data transmission, and transmit downlink data to the UE, while the timer T3 is running, and determine that the UE enters the DRX state, and will not transmit any downlink data to the UE, after the timer T3 expires; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, and will not transmit any downlink data to the UE, after the timer T4 expires, where in the branch 2, the timer T4 may be the same as the timer T3, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the gNB will determine that the UE enters the DRX state after receiving downlink data transmission, and will not transmit any downlink data to the UE while the UE remains in the DRX state.

Thirdly respective embodiments of the disclosure will be described in which the UE starts listening to downlink data transmission after transmitting a specific uplink data packet of a specific type of service in the RRC_INACTIVE state.

Seventh Embodiment

The UE enters the consecutive reception state after transmitting a specific uplink data packet of a specific type of service in the RRC_INACTIVE state, listens to downlink data transmission until downlink data transmission is received, and enters the DRX state after receiving downlink data.

In the embodiment of the disclosure, a period of time for the UE to listen to downlink data is determined in such a way that the UE enters the consecutive reception state upon completion of uplink data transmission, listens to downlink data transmission until downlink data transmission is received, and enters the DRX state after receiving downlink data.

The UE starts a downlink data transmission listening procedure under the condition that the UE starts listening to downlink data transmission after transmitting the specific uplink data packet of the specific type of service in the RRC_INACTIVE state.

The specific type of service can be configured by the gNB for each UE via a broadcast message, or can be configured by the gNB for the UE via dedicated signaling. The UE is configured by the gNB with the specific type of service via the broadcast message or the dedicated signaling carrying identifier information of the type of service, and the identifier information of the type of service includes an application layer identifier, or an RB ID, or an LCID, or a flow ID.

The specific uplink data packet is an uplink data packet requiring the gNB to transmit corresponding downlink data transmission, that is, the specific uplink data packet refers to a subsequent data packet, determined by the UE, corresponding to downlink data transmission, and for example, the UE receives downlink TCP ACK information after transmitting several instances of TCP uplink data transmission. An uplink data packet before the TCP ACK information is the specific uplink data packet. When the UE transmits the specific uplink data packet of the specific type of service in the RRC_INACTIVE state, the UE can transmit indication information to the gNB that the UE is going to listen to downlink data transmission, before listening to downlink data transmission in the specific period of time.

In the embodiments of the disclosure, operations performed by the UE at the UE side include the following operations.

The first operation is to enter the consecutive reception state after transmitting of the specific uplink data packet of the specific type of service in the RRC_INACTIVE state, to listen to downlink data transmission, and to proceed to the second operation; or if the uplink data packet transmitted by the UE in the RRC_INACTIVE state does not allow the UE to listen to downlink data transmission, to enter the DRX state directly without proceeding to the second operation after transmitting the uplink data. Optionally the UE transmits indication information to the gNB that the UE is going to listen to downlink data transmission, upon completion transmission of the last specific uplink data packet.

The second operation is to receive downlink data transmission, and to proceed to the third operation; otherwise, to further listen to downlink data transmission.

The third operation includes the following branches in parallel: in a branch 1, if the UE is not configured by the gNB with the timer T4 for further listening to downlink data transmission, then the UE will receive instruction information transmitted by the gNB to further listen to downlink data transmission, further listen to downlink data transmission, and enter the DRX state after receiving downlink data transmission; or in a branch 2, if the UE is configured by the gNB with the timer T4 for further listening to downlink data transmission, then the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires; or in a branch 3, if the UE is not configured by the gNB with the timer T4 for further listening to downlink data transmission, and the gNB does not instruct the UE in downlink data transmission to further listen to downlink data transmission, then the UE will enter the DRX state directly after receiving downlink data.

In the embodiment of the disclosure, operations performed at the gNB include the following operations.

The first operation is to determine whether a service including uplink data transmitted by the UE is of the specific type of service allowing the UE to listen to downlink data transmission, after receiving the uplink data, and if so, to determine implicitly whether a data packet of the service is the specific data packet of the specific type of service allowing the UE to listen to downlink data transmission, according to indication information transmitted by the UE, a service characteristic, etc., and if so, to start the timer T1, to determine that the UE enters the consecutive reception state, and to proceed to the second operation; otherwise, to determine that the UE enters the DRX state, without proceeding to the second operation.

The second operation is to transmit downlink data to the UE at any instance of time when there are the downlink data to be transmitted to the UE.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, then the gNB may transmit instruction information to the UE in downlink data transmission to further listen to downlink data transmission, determine that the UE remains in the consecutive reception state, and subsequently transmit downlink data to the UE; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, after the timer T4 expires, and will not transmit any downlink data to the UE while the UE remains in the DRX state, in this branch, the gNB can transmit downlink data to the UE while the timer T4 is running, determine that the timer T4 is restarted, when downlink data or a downlink scheduling command are or is transmitted each time, and determine that the UE enters the DRX state, after the timer T4 expires, and will not transmit any downlink data to the UE while the UE remains in the DRX state; or in a branch 3, if the UE is not configured by the gNB with the timer T4 for further listening to downlink data transmission, and the gNB does not instruct the UE in downlink data transmission to further listen to downlink data transmission, then the gNB will determine that the UE enters the DRX state after receiving downlink data, and will not transmit any downlink data to the UE while the UE remains in the DRX state.

Eighth Embodiment

The UE enters the consecutive reception state after transmitting a specific uplink data packet of a specific type of service in the RRC_INACTIVE state, starts the timer T1, listens to downlink data transmission in the timing length of time of the timer T1, and enters the DRX state after the timer T1 expires, or downlink data are received.

In the embodiment of the disclosure, a period of time for the UE to listen to downlink data is determined in such a way that the UE enters the consecutive reception state upon completion of uplink data transmission, stars the timer T1, listens to downlink data transmission, and enters the DRX state after the timer T1 expires, or downlink data are received, where the timing length of time of the timer T1 can be configured by the gNB for each UE via a broadcast message, or can be configured by the gNB for the UE via dedicated signaling, or can be specified in a protocol.

The UE starts a downlink data transmission listening procedure under the condition that the UE starts listening to downlink data transmission after transmitting the specific uplink data packet of the specific type of service in the RRC_INACTIVE state.

The specific type of service can be configured by the gNB for each UE via a broadcast message, or can be configured by the gNB for the UE via dedicated signaling. The UE is configured by the gNB with the specific type of service via the broadcast message or the dedicated signaling carrying identifier information of the type of service, and the identifier information of the type of service includes an application layer identifier, or an RB ID, or an LCID, or a flow ID.

The specific uplink data packet is an uplink data packet requiring the gNB to transmit corresponding downlink data transmission. That is, the specific uplink data packet refers to a subsequent data packet, determined by the UE, corresponding to downlink data transmission, and for example, the UE receives downlink TCP ACK information after transmitting several instances of TCP uplink data transmission. An uplink data packet before the TCP ACK information is the specific uplink data packet. When the UE transmits the specific uplink data packet of the specific type of service in the RRC_INACTIVE state, the UE can transmit indication information to the gNB that the UE is going to listen to downlink data transmission, before listening to downlink data transmission in the specific period of time.

In the embodiment of the disclosure, operations performed by the UE at the UE side include the following operations.

The first operation is to start the timer T1 and to proceed to the second operation after transmitting the specific uplink data packet of the specific type of service in the RRC_INACTIVE state; or if the uplink data packet transmitted by the UE in the RRC_INACTIVE state does not allow the UE to listen to downlink data transmission, to enter the DRX state directly without proceeding to the second operation after transmitting the uplink data. Optionally the UE transmits indication information to the gNB that the UE is going to listen to downlink data transmission, upon completion transmission of the last specific uplink data packet.

The second operation is to enter the consecutive reception state and to listen to downlink data transmission while the timer T1 is running, and if no downlink data transmission is received, and the timer T1 expires, to enter the DRX state; or if downlink data transmission is received, to proceed to the third operation.

The third operation includes the following branches in parallel: in a branch 1, if the UE is not configured by the gNB with the timer T4 for further listening to downlink data transmission, then the UE will receive instruction information transmitted by the gNB to further listen to downlink data transmission, restart the timer T1, further listen to downlink data transmission, restart the timer T1 upon reception of new instruction information to further listen to downlink data transmission each time, listen to downlink data transmission while the timer T1 is running, and enter the DRX state after the timer T1 expires, or downlink data are received; or in a branch 2, if the UE is configured by the gNB with the timer T4 for further listening to downlink data transmission, then the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires, where in the branch 2, the timer T4 may be the same as the timer T1, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the UE will enter the DRX state directly after receiving downlink data.

In the embodiment of the disclosure, operations performed at the gNB include the following operations.

The first operation is to determine whether a service including uplink data transmitted by the UE is of the specific type of service allowing the UE to listen to downlink data transmission, after receiving the uplink data, and if so, to determine implicitly whether a data packet of the service is the specific data packet of the specific type of service allowing the UE to listen to downlink data transmission, according to indication information transmitted by the UE, a service characteristic, etc., and if so, to start the timer T1, to determine that the UE enters the consecutive reception state, and to proceed to the second operation; otherwise, to determine that the UE enters the DRX state, without proceeding to the second operation.

The second operation is to transmit downlink data to the UE when there are the downlink data to be transmitted to the UE, while the timer T1 is running, and to proceed to the third operation after transmitting the downlink data, or to determine that the UE enters the DRX state, after the timer T1 expires; and not to transmit any downlink data to the UE while the UE remains in the DRX state.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, then the gNB may transmit instruction information to the UE in downlink data transmission to further listen to downlink data transmission, restart the timer T1 after transmitting the instruction information to further listen to downlink data transmission each time, determine that the UE is listening to downlink data transmission, and transmit downlink data to the UE, while the timer T1 is running, and determine that the UE enters the DRX state, and will not transmit any downlink data to the UE, after the timer T1 expires; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, and will not transmit any downlink data to the UE, after the timer T4 expires, where in the branch 2, the timer T4 may be the same as the timer T1, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the gNB will determine that the UE enters the DRX state after receiving downlink data, and will not transmit any downlink data to the UE while the UE remains in the DRX state.

Ninth Embodiment

The UE starts the timer T2 after transmitting a specific uplink data packet of a specific type of service in the RRC_INACTIVE state, enters the DRX state in the timing length of time of the timer T2, enters the consecutive reception state after the timer T2 expires, listens to downlink data transmission in the timing length of time of the timer T3, and enters the DRX state after the timer T3 expires, or downlink data are received.

In the embodiment of the disclosure, a period of time for the UE to listen to downlink data is determined in such a way that the UE starts the timer T2 upon completion of uplink data transmission, enters the DRX state while the timer T2 is running, i.e., in the timing length of time of the timer T2, enters the consecutive reception state and starts the timer T3 after the timer T2 expires, listens to downlink data transmission while the timer T3 is running, and enters the DRX state after the timer T3 expires, or downlink data are received, where the timing length of time of the timer T2, and the timing length of time of the timer T3 can be configured by the gNB for each UE via a broadcast message, or can be configured by the gNB for the UE via dedicated signaling, or can be prescribed in a protocol. The timing length of time of the timer T1, the timing length of time of the timer T2, and the timing length of time of the timer T3 may or may not be determined in the same way.

The UE starts a downlink data transmission listening procedure under the condition that the UE starts listening to downlink data transmission after transmitting the specific uplink data packet of the specific type of service in the RRC_INACTIVE state.

The specific type of service can be configured by the gNB for each UE via a broadcast message, or can be configured by the gNB for the UE via dedicated signaling. The UE is configured by the gNB with the specific type of service via the broadcast message or the dedicated signaling carrying identifier information of the type of service, and the identifier information of the type of service includes an application layer identifier, or an RB ID, or an LCID, or a flow ID.

The specific uplink data packet is an uplink data packet requiring the gNB to transmit corresponding downlink data transmission, that is, the specific uplink data packet refers to a subsequent data packet, determined by the UE, corresponding to downlink data transmission, and for example, the UE receives downlink TCP ACK information after transmitting several instances of TCP uplink data transmission. An uplink data packet before the TCP ACK information is the specific uplink data packet. When the UE transmits the specific uplink data packet of the specific type of service in the RRC_INACTIVE state, the UE can transmit indication information to the gNB that the UE is going to listen to downlink data transmission, before listening to downlink data transmission in the specific period of time.

In the embodiment of the disclosure, operations performed by the UE at the UE side include the following operations.

The first operation is to start the timer T2 after transmitting the specific uplink data packet of the specific type of service in the RRC_INACTIVE state, and to proceed to the second operation without listening to downlink data transmission while the timer T2 is running; or if the uplink data packet transmitted by the UE in the RRC_INACTIVE state does not allow the UE to listen to downlink data transmission, to enter the DRX state directly without proceeding to the second operation after transmitting the uplink data. Optionally the UE transmits indication information to the gNB that the UE is going to listen to downlink data transmission, upon completion transmission of the last specific uplink data packet.

The second operation is to start the timer T3 upon detecting that the timer T2 expires, and to enter the consecutive reception state and to listen to downlink data transmission while the timer T3 is running; and if no downlink data transmission is received, and the timer T3 expires, to enter the DRX state, or if downlink data transmission is received, to proceed to the third operation.

The third operation includes the following branches in parallel: in a branch 1, if the UE is not configured by the gNB with the timer T4 for further listening to downlink data transmission, then the UE will receive instruction information transmitted by the gNB to further listen to downlink data transmission, restart the timer T3, further listen to downlink data transmission, restart the timer T3 upon reception of new instruction information to further listen to downlink data transmission each time, listen to downlink data transmission while the timer T3 is running, and enter the DRX state after the timer T3 expires, or downlink data are received; or in a branch 2, if the UE is configured by the gNB with the timer T4 for further listening to downlink data transmission, then the UE will start the timer T4 upon reception of downlink data transmission or a downlink scheduling command, restart the timer T4 upon reception of new downlink data transmission or a new downlink scheduling command each time, listen to downlink data transmission while the timer T4 is running, and enter the DRX state after the timer T4 expires, where in the branch 2, the timer T4 may be the same as the timer T3, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the UE will enter the DRX state directly after receiving downlink data.

In the embodiment of the disclosure, operations performed by the gNB include the following operations.

The first operation is to determine whether a service including uplink data transmitted by the UE is of the specific type of service allowing the UE to listen to downlink data transmission, after receiving the uplink data, and if so, to determine implicitly whether a data packet of the service is the specific data packet of the specific type of service allowing the UE to listen to downlink data transmission, according to indication information transmitted by the UE, a service characteristic, etc., and if so, to prepare for transmitting downlink data to the UE, and to start the timer T2.

The second operation is to start the timer T3 upon detecting that the timer T2 expires, to transmit downlink data to the UE when there are the downlink data to be transmitted to the UE, while the timer T3 is running, and to proceed to the third operation upon completion transmission of the downlink data, or to determine that the UE enters the DRX state, after the timer T3 expires.

The third operation includes the following branches in parallel: in a branch 1, if the UE is not configured with the timer T4 for further listening to downlink data transmission, but a function of the gNB to instruct the UE in downlink data transmission to further listen to downlink data transmission is enabled, then the gNB may transmit instruction information to the UE in downlink data transmission to further listen to downlink data transmission, restart the timer T3 after transmitting the instruction information to further listen to downlink data transmission each time, determine that the UE is listening to downlink data transmission, and transmit downlink data to the UE, while the timer T3 is running, and determine that the UE enters the DRX state, and will not transmit any downlink data to the UE, after the timer T3 expires; or in a branch 2, if the UE is configured by the gNB with the timer T4 for further listening to downlink data transmission, then the gNB will start or restart the timer T4 when downlink data or a downlink scheduling command are or is transmitted each time, transmit downlink data to the UE while the timer T4 is running, and determine that the UE enters the DRX state, and will not transmit any downlink data to the UE, after the timer T4 expires, where in the branch 2, the timer T4 may be the same as the timer T3, and at this time, the branch 1 and the branch 2 can be combined; or in a branch 3, if the UE is not configured by the gNB with the timer T4 for further listening to downlink data transmission, and the gNB does not instruct the UE in downlink data transmission to further listen to downlink data transmission, then the gNB will determine that the UE enters the DRX state after receiving downlink data transmission, and will not transmit any downlink data to the UE while the UE remains in the DRX state.

Next respective embodiments of the disclosure will be described in which the UE receives downlink data in the RRC_INACTIVE state.

Tenth Embodiment

The UE receives downlink data particularly by receiving a downlink notification transmitted by the gNB to page the UE, and receiving the downlink data transmitted together with the notification.

In the embodiment of the disclosure, operations performed by the UE at the UE side include the following operations.

The first operation is to receive a notification carrying an RRC_INACTIVE UE ID to instruct the UE to receive downlink data.

The second operation (optional) is to transmit a feedback message to the gNB, where the feedback message is particularly a random access request preamble, or ACK feedback of a physical resource position and a feedback sequence corresponding to the notification.

The third operation is to receive downlink data transmission transmitted together with the notification, or transmitted at the corresponding resource position after the notification.

The fourth operation (optional) is to transmit a feedback message to the gNB, where the feedback message is particularly a random access request preamble, or ACK feedback at a physical resource position corresponding to the notification, and of a corresponding feedback sequence.

In the embodiment of the disclosure, operations performed at the gNB include the following operations.

The first operation is to transmit a notification to the UE side in a cell in which the UE lastly transmits uplink transmission, or a cell in which the UE lastly feeds back the position, where the notification carries an RRC_INACTIVE UE ID, and instructs the UE to receive downlink data.

The second operation (optional) is to receive a feedback message transmitted by the UE to the gNB, where the feedback message is particularly a random access request preamble, or an ACK feedback of a physical resource position and a feedback sequence corresponding to the notification.

The third operation is to transmit downlink data to the UE, particularly together with the notification, or at the corresponding resource position after the notification.

The fourth operation (optional) is to receive a feedback message transmitted by the UE, where the feedback message is particularly a random access request preamble, or an ACK feedback of a physical resource position and a feedback sequence corresponding to the notification.

The fifth operation is, if no feedback message transmitted by the UE is received, or after a preset number of times that the gNB transmits downlink data, to go back to the first operation to further transmit downlink data to the UE until a feedback message transmitted by the UE is received, to determine that the downlink data are transmitted successfully, or to determine that the UE enters the DRX state, or not to transmit any downlink data to the UE after reaching the largest number of times that the gNB transmits downlink data.

Eleventh Embodiment

The UE receives downlink data particularly by receiving a downlink scheduling command transmitted by the gNB, which carries an RNTI common to RRC_INACTIVE UEs, receiving downlink data transmission scheduled by the downlink scheduling command, determining whether UE ID information carried in the downlink data transmission is the same as its own UE ID information, and if so, then parsing the downlink data transmission for the downlink data.

In the embodiment of the disclosure, operations performed by the UE at the UE side include the following operations.

The first operation is to receive a downlink scheduling command which is a Physical Downlink Control Channel (PDCCH) (NR-PDCCH) carrying a common RNTI for all the RRC_INACTIVE UEs, to receive downlink data transmission according to the downlink scheduling command, to parse the downlink data transmission for a Media Access Control Protocol Data Unit (MAC PDU) including an MAC CE and downlink data, to parse the MAC CE for a UE ID, to determine whether the UE ID is the RRC_INACTIVE UE ID of the UE, and if so, to receive a downlink data component in the MAC PDU.

The second operation (optional) is to transmit a feedback message to the gNB, where the feedback message is particularly a random access request preamble, or an ACK feedback transmitted at a resource position corresponding to the downlink scheduling command or the downlink data transmission, and of a corresponding feedback sequence.

The third operation is, if the UE fails to receive the downlink data transmission, to keep on listening to downlink data transmission in a downlink data listening period of time.

In the embodiment of the disclosure, operations performed at the gNB include the following operations.

The first operation is to transmit a downlink scheduling command (NR-PDCCH) and downlink data transmission to the UE in a cell where the UE lastly transmits uplink transmission, or in a cell in which the UE lastly feeds back the position, where the downlink scheduling command carries an RNTI common to RRC_INACTIVE UEs, an MAC PDU including the downlink data transmission includes an MAC CE and downlink data, the MAC CE includes an RRC_INACTIVE UE ID, and a downlink data component includes downlink data transmitted to the UE.

The second operation (optional) is to receive a feedback message of the UE, where the feedback message is a random access request preamble, or an ACK feedback transmitted at a resource position corresponding to the downlink scheduling command or the downlink data transmission, and of a corresponding feedback sequence.

The third operation is, if no feedback message transmitted by the UE is received, or after a preset number of times that the gNB transmits downlink data, to go back to the first operation to further transmit downlink data to the UE until a feedback message transmitted by the UE is received, to determine that the downlink data are transmitted successfully, or to determine that the UE enters the DRX state, or not to transmit any downlink data to the UE after reaching the largest number of times that the gNB transmits downlink data.

Twelfth Embodiment

The UE receives downlink data particularly by receiving a downlink scheduling command transmitted by the gNB, determining whether a C-RNTI of the UE carried in the downlink scheduling command is the same as its own C-RNTI, and if so, then receiving downlink data transmission scheduled by the downlink scheduling command.

In the embodiment of the disclosure, operations performed by the UE at the UE side include the following operations.

The first operation is to receive a downlink scheduling command (NR-PDCCH) carrying the C-RNTI of the UE, to determine that the downlink data are transmitted to the UE, according to the C-RNTI, and to receive downlink data transmission corresponding to the downlink scheduling command.

The second operation (optional) is to transmit a feedback message to the gNB, where the feedback message is particularly a random access request preamble, or an ACK feedback transmitted at a resource position corresponding to the downlink scheduling command or the downlink data transmission, and of a corresponding feedback sequence.

The third operation is, if the UE fails to receive the downlink data transmission, to keep on listening to downlink data transmission in a downlink listening period of time.

In the embodiment of the disclosure, operations performed at the gNB include the following operations.

The first operation is to transmit a downlink scheduling command (NR-PDCCH) and downlink data transmission to the UE in a cell where the UE lastly transmits uplink transmission, or in a cell in which the UE lastly feeds back the position, where the downlink scheduling command carries the C-RNTI of the UE, and the downlink data transmission includes downlink data transmitted to the UE.

The second operation (optional) is to receive a feedback message of the UE, where the feedback message is particularly a random access request preamble, or an ACK feedback transmitted at a resource position corresponding to the scheduling command or the downlink data transmission, and of a corresponding feedback sequence.

The third operation is, if no feedback message transmitted by the UE is received, or after a preset number of times that the gNB transmits downlink data, to go back to the first operation to further transmit downlink data to the UE until a feedback message transmitted by the UE is received, to determine that the downlink data are transmitted successfully, or to determine that the UE enters the DRX state, or that the largest number of times that the gNB transmits downlink data is reached.

Figure 3:
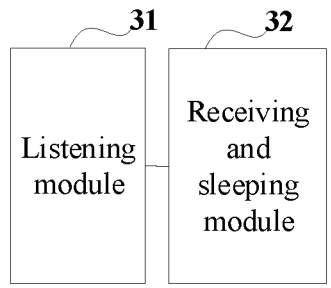
FIG. 3 is a structural diagram of a data transmission device according to an embodiment of the disclosure.

FIG. 3 is a structural diagram of a data transmitting device according to an embodiment of the disclosure, where the device includes: a listening module 31 configured to listen to downlink data transmission in a specific period of time after a UE transmits uplink data in an RRC_INACTIVE state; and a receiving and sleeping module 32 configured to enter a Discontinuous Reception (DRX) state after the specific period of time expires, or downlink data are received.

The listening module 31 is configured to enter a consecutive reception state after the uplink data are transmitted, until downlink data transmission are detected, or to enter a consecutive reception state after the uplink data are transmitted, to start a timer T1, and to listen to downlink data transmission in a timing length of time of the timer T1; or to start a timer T2 after the uplink data are transmitted, to enter the DRX state in a timing length of time of the timer T2, to start a timer T3 after the timer T2 expires, to enter the consecutive reception state, and to listen to downlink data transmission in a timing length of time of the timer T3.

The listening module 31 is further configured to receive the downlink data including information of the network side to instruct the UE to further listen to downlink data transmission, and to listen again to downlink data transmission in the specific period of time; or to receive the downlink data or a downlink scheduling command, to start a timer T4, to listen to downlink data transmission in a timing length of time of the timer T4, and to restart the timer T4 upon reception of new downlink data or a new downlink scheduling command.

The device further includes: a transmitting module configured to transmit instruction information to the network side that the UE is going to listen to downlink data transmission.

The receiving and sleeping module 32 is configured to receive a downlink notification transmitted by the network side to page the UE, and downlink data transmitted together with the notification; or to receive a downlink scheduling command transmitted by the network side, which carries an RNTI common to RRC_INACTIVE UEs, to receive downlink data transmission scheduled by the downlink scheduling command, to determine whether UE ID information carried in the downlink data transmission is the same as its own UE ID information, and if so, to parse the downlink data transmission for the downlink data; or to receive a downlink scheduling command transmitted by the network side, to determine the C-RNTI of the UE carried in the downlink scheduling command is the same as its own C-RNTI, and if so, to receive downlink data transmission scheduled by the downlink scheduling command.

The data transmitting device above is located in the UE.

Figure 4:
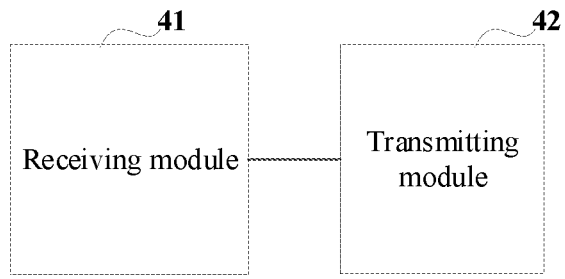
FIG. 4 is a structural diagram of a data transmission device according to an embodiment of the disclosure.

FIG. 4 is a structural diagram of a data transmitting device according to an embodiment of the disclosure, where the device includes: a receiving module 41 configured to transmit uplink data with a UE in an RRC_INACTIVE state; and a transmitting module 42 configured to transmit downlink data to the UE in a specific period of time.

The transmitting module 42 is configured to transmit the downlink data to the UE an any instance of time after transmitting the uplink data with the UE; or to start a timer T1 after transmitting the uplink data with the UE, and to transmit the downlink data to the UE in a timing length of time of the timer T1; or to start a timer T2 after transmitting the uplink data with the UE, to start a timer T3 after the timer T2 expires, and to transmit the downlink data to the UE in a timing length of time of the timer T3.

The transmitting module 42 is further configured to transmit information to the UE to instruct the UE to further listen to downlink data transmission, and to transmit downlink data again to the UE in the specific period of time; or to start a timer T4 after transmitting the downlink data or a downlink scheduling command, and to restart the timer T4 after transmitting new downlink data or a new downlink scheduling command.

The receiving module 41 is further configured to receive indication information transmitted by the UE that the UE is going to listen to downlink data transmission.

The transmitting module 42 is configured to transmit a downlink notification to the UE to page the UE, and to transmit the downlink data together with the notification; or to transmit a downlink scheduling command to the UE, which carries an RNTI common to RRC_INACTIVE UEs, and to schedule downlink data transmission to the UE according to the downlink scheduling command, where the downlink data transmission carries UE ID information and downlink data, or to transmit a downlink scheduling command to the UE, and to schedule downlink data transmission to the UE according to the downlink scheduling command, where the downlink scheduling command carries the C-RNTI of the UE.

The data transmitting device above is located at the network side, and particularly can be located in a gNB.

Figure 5:
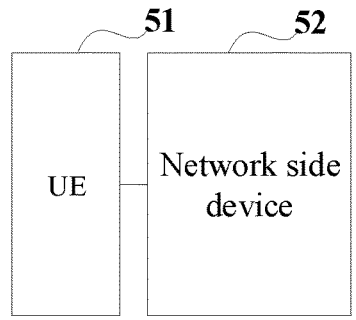
FIG. 5 is a structural diagram of a data transmission system according to an embodiment of the disclosure.

FIG. 5 is a structural diagram of a data transmitting system according to an embodiment of the disclosure, where the system includes a data transmitting device applicable to a UE 51, and a data transmitting device applicable to a network-side device 52.

In the data transmission method, device, and system according to the embodiments of the disclosure, the method includes: a UE listens to downlink data transmission in a specific period of time after transmitting uplink data in an RRC_INACTIVE state; and enters a DRX state after the specific period of time expires, or downlink data are received. Since the UE can listen to downlink data in the specific period of time after transmitting uplink data, and enter the DRX state after the specific period of time expires, or downlink data are received, the gNB can transmit the downlink data to the UE in the RRC_INACTIVE state in a timely manner to thereby avoid subsequent data transmission from being delayed.

An embodiment of the disclosure discloses a UE particularly as follows.

Figure 6:
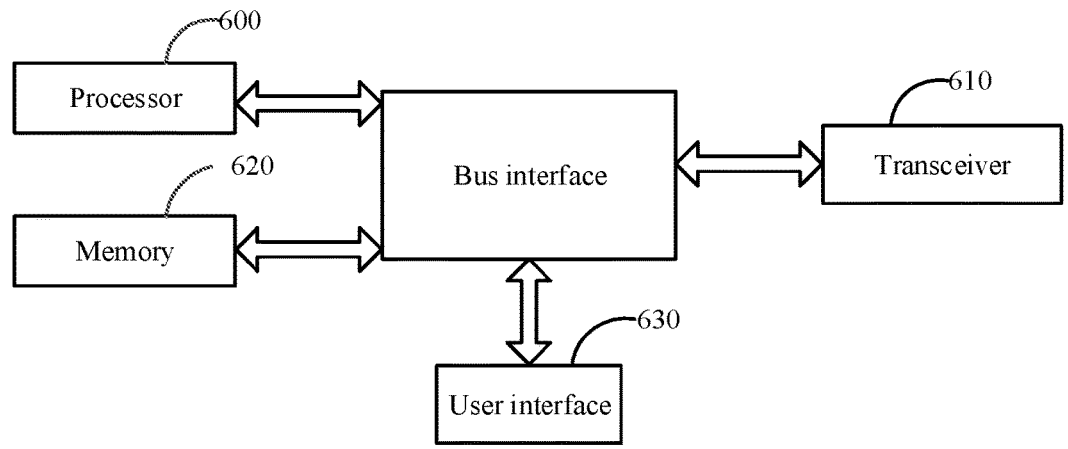
FIG. 6 is a schematic structural diagram of a UE according to an embodiment of the disclosure.

FIG. 6 is a schematic structural diagram of the UE, and as illustrated, the UE includes: a transceiver 610 configured to transmit and receive data under the control of a processor 600, and configured to transmit uplink and downlink data; and the processor 600 configured to read and execute program in a memory 620 to listen to downlink data transmission in a specific period of time after the UE transmits uplink data in an RRC_INACTIVE state; and to enter a Discontinuous Reception (DRX) state after the specific period of time expires, or downlink data are received.

In an implementation, the processor 600 configured to listen to downlink data transmission in the specific period of time is configured: to enter a consecutive reception state after the UE transmits the uplink data, until downlink data transmission are detected; or to enter a consecutive reception state after the UE transmits the uplink data, to start a timer T1, and to listen to downlink data transmission in a timing length of time of the timer T1; or to start a timer T2 after the UE transmits the uplink data, to enter the DRX state in a timing length of time of the timer T2, to start a timer T3 after the timer T2 expires, to enter the consecutive reception state, and to listen to downlink data transmission in a timing length of time of the timer T3.

In an implementation, the processor 600 configured to listen to downlink data transmission in the specific period of time is further configured: to receive the downlink data including information of a network side to instruct the UE to further listen to downlink data transmission, and to listen again to downlink data transmission in the specific period of time; or to receive the downlink data or a downlink scheduling command, to start a timer T4, to listen to downlink data transmission in a timing length of time of the timer T4, and to restart the timer T4 upon reception of new downlink data or a new downlink scheduling command.

In an implementation, the timing length of time of the timer T1, the timing length of time of the timer T2, the timing length of time of the timer T3, and the timing length of time of the timer T4 are determined as follows.

They are configured by the network side for the UE via a broadcast message; or they are configured by the network side for the UE via dedicated signaling; or they are prescribed in a protocol.

In an implementation, the uplink data transmission include: any one instance of uplink data transmission; or any one instance of uplink data transmission of a specific type of service; or transmission of a specific uplink data packet of a specific type of service; or uplink data transmission in a preset period of time.

In an implementation, the specific type of service is configured by the network side for the UE via a broadcast message, or configured by the network side for the UE via dedicated signaling.

In an implementation, the specific uplink data packet is an uplink data packet requiring the network side to transmit corresponding downlink data transmission.

In an implementation, the preset period of time is configured by the network side for the UE via a broadcast message; or the preset period of time is configured by the network side for the UE via dedicated signaling; or the preset period of time is a period of time in which transmission of the specific type of service is active, or the UE has data to be transmitted.

In an implementation, the UE is configured by the network side with the specific type of service via the broadcast message or the dedicated signaling carrying identifier information of the type of service, where the identifier information of the type of service includes an application layer identifier, a Radio Bearer Identifier (RB ID), a Logic Channel Identifier (LCID), or a Flow Identifier (ID).

In an implementation, when the UE transmits an uplink data packet in the RRC_INACTIVE state, before the UE listens to downlink data transmission in the specific period of time, the processor is further configured: to transmit indication information to a network side that the UE is going to listen to downlink data transmission.

In an implementation, the processor 600 configured to receive the downlink data is configured: to receive a downlink notification transmitted by the network side to page the UE, and receiving downlink data transmitted together with the notification; or to receive a downlink scheduling command transmitted by the network side, which carries an RNTI common to RRC_INACTIVE UEs, receiving downlink data transmission scheduled by the downlink scheduling command, to determine whether UE ID information carried in the downlink data transmission is the same as its own UE ID information, and if so, to parse the downlink data transmission for the downlink data; or to receive a downlink scheduling command transmitted by the network side, to determine the C-RNTI of the UE carried in the downlink scheduling command is the same as its own C-RNTI, and if so, to receive downlink data transmission scheduled by the downlink scheduling command.

Here in FIG. 6, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. For different user equipments, the user interface 630 can also be an interface via which devices are connected internally and externally as needed, and the connected devices include but will not be limited to a keypad, a monitor, a speaker, a microphone, a joystick, etc.

The processor 600 is responsible for managing the bus architecture and performing normal processes, and the memory 620 can store data for use by the processor 600 in performing the operations.

An embodiment of the disclosure discloses a gNB particularly as follows.

Figure 7:
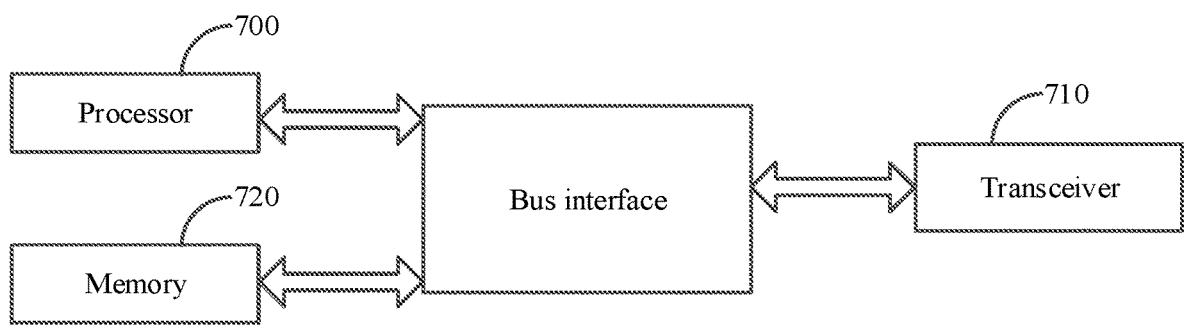
FIG. 7 is a schematic structural diagram of a Node B according to an embodiment of the disclosure.

FIG. 7 is a schematic structural diagram of the gNB, and as illustrated, the gNB includes: a processor 700 configured to read and execute program in a memory 720 to determine whether uplink data are transmitted by the network side with a UE in an RRC_INACTIVE state; and a transceiver 710 configured to transmit and receive data under the control of the processor 700, and configured to transmit downlink data to the UE in a specific period of time after the uplink data are transmitted by the network side with the UE in an RRC_INACTIVE state.

In an implementation, the transceiver 710 configured to transmit downlink data to the UE in the specific period of time: to transmit the downlink data to the UE at any instance of time after the uplink data are transmitted by the network side with the UE; or to start a timer T1 after the uplink data are transmitted by the network side with the UE, and to transmit the downlink data to the UE in a timing length of time of the timer T1; or to start a timer T2 after the uplink data are transmitted by the network side with the UE, to start a timer T3 after the timer T2 expires, and to transmit the downlink data to the UE in a timing length of time of the timer T3.

In an implementation, the transceiver 710 configured to transmit the downlink data to the UE in the specific period of time is further configured: to transmit information to the UE to instruct the UE to further listen to downlink data transmission, and to transmit downlink data again to the UE in the specific period of time; or to start a timer T4 after transmitting the downlink data or a downlink scheduling command, and to restart the timer T4 after transmitting new downlink data or a new downlink scheduling command.

In an implementation, the timing length of time of the timer T1, the timing length of time of the timer T2, the timing length of time of the timer T3, and the timing length of time of the timer T4 are preconfigured by the network side of the UE, or prescribed in a protocol.

In an implementation, the uplink data include: any one set of uplink data; or any one set of uplink data of a specific type of service; or a specific uplink data packet of a specific type of service; or uplink data in a preset period of time.

In an implementation, the specific type of service is preconfigured by the network side for the UE.

In an implementation, the specific uplink data packet is an uplink data packet requiring the network side to transmit corresponding downlink data transmission.

In an implementation, when the network side transmits the uplink data with the UE in the RRC_INACTIVE state, the transceiver 710 is further configured: to receive indication information transmitted by the UE that the UE is going to listen to downlink data transmission.

In an implementation, the transceiver 710 configured to transmit the downlink data to the UE is configured: to transmit a downlink notification to the UE to page the UE, and to transmit the downlink data together with the downlink notification; or to transmit a downlink scheduling command to the UE, where the downlink scheduling command carries an RNTI common to RRC_INACTIVE UEs, and to schedule downlink data transmission to the UE according to the downlink scheduling command, where the downlink data transmission carries UE ID information and the downlink data; or to transmit a downlink scheduling command to the UE, and to schedule downlink data transmission to the UE according to the downlink scheduling command, where the downlink scheduling command carries a C-RNTI of the UE.

Here in FIG. 7, the bus architecture can include any number of interconnecting buses and bridges to particularly link together various circuits including one or more processors represented by the processor 700, and one or more memories represented by the memory 720. The bus architecture can further link together various other circuits, e.g., a peripheral device, a manostat, a power management circuit, etc., all of which are well known in the art, so a further description thereof will be omitted in this context. The bus interface serves as an interface. The transceiver 710 can be a number of elements, e.g., a transmitter and a receiver, which are units for communication with various other devices over a transmission medium. The processor 700 is responsible for managing the bus architecture and performing normal processes, and the memory 720 can store data for use by the processor 700 in performing the operations.

An embodiment of the disclosure discloses a computer device including a memory, a processor, and computer program stored on the memory, and executable on the processor, where the processor executes the computer program to perform the data transmitting method at the UE side. Reference can be made to the embodiment above for details thereof.

An embodiment of the disclosure discloses a computer device including a memory, a processor, and computer program stored on the memory, and executable on the processor, where the processor executes the computer program to perform the data transmitting method at the network side. Reference can be made to the embodiment above for details thereof.

Since the device and system embodiments are substantially similar to the method embodiments, they have been described briefly, and reference can be made to the description of the method embodiments for details thereof.

It shall be noted that such relationship terms in this context as first and second, etc., are merely intended to distinguish one entity or operation from another entity or operation, but not necessarily intended to require or suggest any such a real relationship or order between these entities or operations.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A data transmission method, comprising:
listening, by a User Equipment (UE), to transmission of downlink data in a specific period of time, after uplink data has been transmitted in a Radio Resource Control inactive (RRC_INACTIVE) state; and
entering a Discontinuous Reception (DRX) state, after the specific period of time expires, or the downlink data has been received;
wherein the method further comprises:
entering, by the UE, a consecutive reception state after the uplink data has been transmitted, and listening to the transmission of the downlink data in the specific period of time; or
entering, by the UE, a consecutive reception state after the uplink data has been transmitted, starting a timer T1, listening to the transmission of the downlink data in a timing length of time of the timer T1, and entering the DRX state after the timer T1 expires, or the downlink data has been received; or
starting, by the UE, a timer T2 after the uplink data has been transmitted, entering the DRX state in a timing length of time of the timer T2, starting a timer T3 after the timer T2 expires, entering a consecutive reception state, listening to the transmission of the downlink data in a timing length of time of the timer T3, and entering the DRX state after the timer T3 expires, or the downlink data has been received; wherein the timing length of time of the timer T2 corresponds to a period of time after the uplink data has been transmitted, until a network side is ready for transmitting the downlink data; and
wherein the method further comprises:
after first downlink data has been received in the specific period of time, continuing listening to transmission of second downlink data in the specific period of time, wherein the first downlink data comprises information that a network side instructs the UE to continue listening to the transmission of the second downlink data in the specific period of time; or
after first downlink data or a first downlink scheduling command has been received, starting a timer T4, listening to transmission of second downlink data in a timing length of time of the timer T4, restarting the timer T4 upon reception of the second downlink data or a second downlink scheduling command, and entering the DRX state after the timer T4 expires.

2. The method according to claim 1, wherein the timing length of time of the timer T1, the timing length of time of the timer T2, the timing length of time of the timer T3, and the timing length of time of the timer T4 are determined as follows:
they are configured by a network side for the UE via a broadcast message; or
they are configured by a network side for the UE via dedicated signaling; or
they are prescribed in a protocol.

3. The method according to claim 1, wherein the transmission of the uplink data comprise:
any one instance of uplink data transmission; or
any one instance of uplink data transmission of a specific type of service; or
transmission of a specific uplink data packet of a specific type of service; or
uplink data transmission in a preset period of time.

4. The method according to claim 3, wherein the specific type of service is configured by a network side for the UE via a broadcast message, or configured by a network side for the UE via dedicated signaling;
wherein the UE is configured by the network side with the specific type of service via the broadcast message or the dedicated signaling carrying identifier information of the type of service, wherein the identifier information of the type of service comprises an application layer identifier, a Radio Bearer Identifier (RB ID), a Logic Channel Identifier (LCD), or a Flow Identifier (ID).

5. The method according to claim 3, wherein the specific uplink data packet is an uplink data packet requiring a network side to transmit corresponding downlink data transmission.

6. The method according to claim 3, wherein the preset period of time is configured by a network side for the UE via a broadcast message; or
the preset period of time is configured by a network side for the UE via dedicated signaling; or
the preset period of time is a period of time in which transmission of the specific type of service is active, or the UE has data to be transmitted.

7. The method according to claim 1, wherein when the UE transmits an uplink data packet in the RRC_INACTIVE state, before the UE listens to the transmission of the downlink data in the specific period of time, the method further comprises:
transmitting indication information to a network side that the UE is going to listen to the transmission of the downlink data.

8. The method according to claim 1, further comprising:
receiving a downlink notification transmitted by a network side to page the UE, and receiving downlink data transmitted together with the downlink notification; or
receiving a downlink scheduling command transmitted by a network side, which carries a Radio Network Temporary Identifier (RNTI) common to RRC_INACTIVE UEs, receiving downlink data transmission scheduled by the downlink scheduling command, determining whether UE ID information carried in the downlink data transmission is the same as its own UE ID information, and if so, parsing the downlink data transmission for the downlink data; or
receiving a downlink scheduling command transmitted by a network side, determining whether a Cell-Radio Network Temporary Identifier (C-RNTI) of the UE carried in the downlink scheduling command is the same as its own C-RNTI, and if so, receiving downlink data transmission scheduled by the downlink scheduling command.

9. A User Equipment (UE), comprising:

a transceiver configured to transmit and receive data under the control of a processor, and configured:

to transmit uplink data and downlink data; and the processor configured to read and execute programs in a memory:

to listen to transmission of downlink data in a specific period of time after the UE has transmitted uplink data in a Radio Resource Control inactive (RRC_INACTIVE) state; and to enter a Discontinuous Reception (DRX) state, after the specific period of time expires, or the downlink data has been received;

wherein the processor is further configured to read and execute the programs in the memory to:

enter a consecutive reception state after the uplink data has been transmitted, and listen to the transmission of the downlink data in the specific period of time; or enter a consecutive reception state after the uplink data has been transmitted, start a timer T1, listen to the transmission of the downlink data in a timing length of time of the timer T1, and enter the DRX state after the timer T1 expires, or the downlink data has been received; or start a timer T2 after the uplink data has been transmitted, enter the DRX state in a timing length of time of the timer T2, start a timer T3 after the timer T2 expires, enter a consecutive reception state, listen to the transmission of the downlink data in a timing length of time of the timer T3, and enter the DRX state after the timer T3 expires, or the downlink data has been received; wherein the timing length of time of the timer T2 corresponds to a period of time after the uplink data has been transmitted, until a network side is ready for transmitting the downlink data; and after first downlink data has been received in the specific period of time, continue listening to transmission of second downlink data in the specific period of time, wherein the first downlink data comprises information that a network side instructs the UE to continue listening to the transmission of the second downlink data in the specific period of time; or after first downlink data or a first downlink scheduling command has been received, start a timer T4, listen to transmission of second downlink data in a timing length of time of the timer T4, restart the timer T4 upon reception of the second downlink data or a second downlink scheduling command, and enter the DRX state after the timer T4 expires.

\* \* \* \* \*